Dec. 12, 1944.   E. E. SIMMONS, JR   2,365,015
FLUID PRESSURE GAUGE
Original Filed Feb. 23, 1940

INVENTOR
Edward E. Simmons, Jr.
BY
ATTORNEY

Patented Dec. 12, 1944

2,365,015

UNITED STATES PATENT OFFICE 2,365,015

FLUID PRESSURE GAUGE

Edward E. Simmons, Jr., Pasadena, Calif.

Original application February 23, 1940, Serial No. 320,327, now Patent No. 2,292,549, dated August 11, 1942. Divided and this application January 7, 1942, Serial No. 425,914

5 Claims. (Cl. 73—88)

This invention relates to fluid pressure measuring means and it is an object of my invention to provide improved means for measuring fluid pressure in a simple and direct manner with a high degree of accuracy and sensitivity and with minimum inertia effects. A further object is to provide an improved differential fluid pressure measuring means.

While various arrangements have heretofore been proposed and used in an endeavor to accomplish either or both of the foregoing objects, yet they have been deficient in certain aspects. In the specific aspect of my invention I obtain my objects by providing a fluid pressure chamber or chambers whose wall or walls are strained in response to fluid pressure and I measure this strain which, if desired, may be used as an index of the fluid pressure. This application is a division of my copending application Serial No. 320,327, filed February 23, 1940, now Patent No. 2,292,549, issued August 11, 1942.

Figure 1:
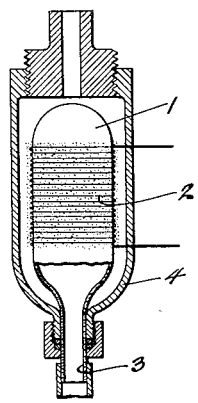
Figure 2:
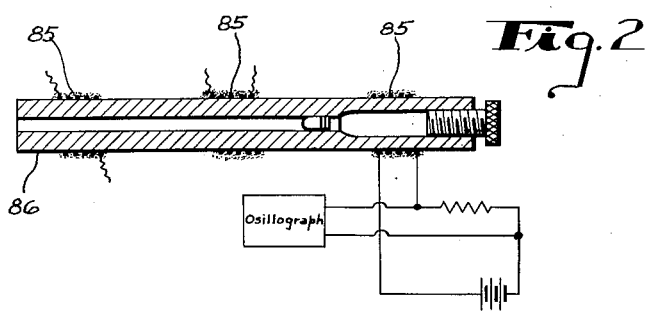

Other objects and advantages will be more apparent to those skilled in the art from the following description of the accompanying drawing in which Fig. 1 is a partial sectional view through my improved bulb type pressure measuring apparatus; and Fig. 2 is a diagrammatic sectional view of a gun barrel employing my invention for measuring the pressure distribution within the barrel.

In Fig. 1 I have illustrated a hollow bulb or vessel 1, preferably of a material such as quartz, having good elastic properties of minimum variation with temperature. An electrical strain sensitive filament 2 is wrapped around the vessel or bulb and secured thereto by bonding the entire effective length of the filament to the wall with "Glyptal" or other suitable bonding cement. Other suitable materials for the bulb having stable elastic characteristics are, for example, certain alloy steels or alloys of copper or of aluminum. In some cases glass may be used but in any event the diameter and the wall thickness of the bulb determine the degree of sensitivity. Fuid pressure to be measured from any desired source is admitted to the chamber of the bulb through a tube or pipe connected to a reduced stem or neck 3.

Pressure fluctuations within the bulb cause the walls thereof to expand and contract in accordance with increases or decreases in pressure and the resistance of the strain sensitive filament varies accordingly. The variations in resistance may be recorded on an oscillograph and the filament and bulb may be precalibrated by the application of known pressures. If desired, the bulb arrangement may be employed as a differential pressure gauge merely by sealing the bulb 1 within a suitable outside pressure chamber 4. This surrounding pressure chamber 4 is connected to any suitable source of pressure and hence the walls of the bulb 1 expand or contract in accordance with the differential pressure on the inside and outside of the bulb. The filament would, therefore, respond only to this differential pressure.

As disclosed in my said copending application the filament consists of very fine metallic wire that is continuously solid throughout its length and whose electrical strain characteristics are predetermined. This wire may be of suitable and well-known material such as "Constantan," "Advance," and various other well-known materials having good resistance properties as well as being capable of fabrication in small wire sizes. The composition of such materials is well-known. Also the strain sensitivity of various materials are either known or readily determined by experiment. Hence, it is not deemed necessary to describe such compositions or characteristics in detail herein. In certain work I have actually used a wire such as No. 40 gauge, approximately 0.0031 of an inch in diameter, such wire filament being preferably round although other shapes may be employed and filaments of 0.001 of an inch in diameter may also be used. The strain responsive filaments employ the well-known principle that the electrical resistance of materials varies with the strain thereof, herein referred to as "electrical strain sensitivity."

Another application of my strain sensitive means to a strain cylindrical device is in the determination of pressure distribution in guns or other explosive operated devices during firing. In a particular case, strain sensitive filaments 85, Fig. 2, were cemented to the outside surface of the cylindrical gun barrel 86 at various positions along its axial length. Each strain element is precalibrated for resistance change against barrel pressure by the application of hydraulic pressure to the bore of the barrel. In operation, the strain elements are connected singly to an oscillograph as shown or to a plurality of oscillograph elements if desired in the manner disclosed in my said copending application, although the measuring circuit per se forms no part of my present invention and hence need not be described further.

From the foregoing disclosure it is seen that I have provided a very simple and direct pressure measuring apparatus that has a high degree of accuracy and sensitivity and is relatively free of inertia effects and as a consequence is admirably adapted to relatively high frequency operation if such should be encountered, particularly as in measuring fluid pressure distribution in a gun barrel. The apparatus as shown in Fig. 1 is adapted for a wide variety of pressure measuring applications and is comparatively inexpensive and has no mechanical parts to get out of order. The change of filament resistance in response to pressures in either form of the invention may be measured by the well-known Wheatstone bridge in which the bridge unbalance is indicated on an oscillograph as more fully disclosed in my copending application but which does not constitute a part of my present invention.

It will of course be understood that various changes in details of construction and arrangement of parts may be made by those skilled in the art without departing from the spirit of the invention as set forth in the appended claims.

I claim:

1. In combination, a hollow member adapted to be subjected to fluid pressure, and a continuous solid filament of electrical conducting material whose electrical resistance varies with its strain, said filament being bonded throughout its effective length to said member so as to be directly responsive to strains therein caused by pressure within the member whereby the pressure is measured with minimum inertia effects.

2. In combination, means having a wall subject to separate fluid pressures, and a continuous solid filament of electrical conducting material whose electrical resistance varies with its strain, said filament being bonded throughout its effective length to said wall so as to be directly responsive to the strains therein arising from the differential pressure effect on said wall whereby the pressure is measured with minimum inertia effects.

3. In combination, a hollow cylindrical member adapted to be subjected to fluid pressure, and a continuous solid filament of electrical conducting material whose electrical resistance varies with its strain, said filament being wound around said member and bonded thereto throughout the effective length of the filament so that expansion of said cylindrical member varies the strain and electrical resistance of said filament in direct response to pressure in said member, whereby measurement of said variation of filament resistance is an indication of the pressure change in said cylindrical member.

4. In combination, a hollow fluid pressure member formed of quartz material, and a continuous solid filament of electrical conducting material whose electrical resistance varies with its strain, said filament being bonded throughout its effective length to said quartz member, whereby variations in pressure therein causes variations in strain of said filament with consequent change in its electrical resistance in proportion to the pressure change in said quartz member.

5. In combination, a hollow fluid pressure responsive vessel provided with a reduced neck through which fluid pressure is transmitted to the interior of said member, a second hollow member surrounding said first mentioned hollow member and having a relatively small opening at one end through which said reduced neck extends and a relatively large opening at the other end through which the body of said first mentioned member may be inserted, means whereby fluid pressure may be admitted to the interior of said second hollow member, and a continuous solid filament of electrical conducting material whose electrical resistance varies with its strain, said filament being bonded throughout its effective length to said first mentioned member so that it is directly responsive to the differential pressure acting on the interior and exterior of said first mentioned member.

EDWARD E. SIMMONS, Jr.